April 28, 1953   E. A. BROOKS   2,636,351
EXPANSION LINKAGE FOR DIRECTING MOTION OF TUBULAR ELEMENTS
Filed July 11, 1950   6 Sheets-Sheet 1

INVENTOR
*Ernest A. Brooks*
BY
*J. P. Moran*
ATTORNEY

April 28, 1953   E. A. BROOKS   2,636,351
EXPANSION LINKAGE FOR DIRECTING MOTION OF TUBULAR ELEMENTS
Filed July 11, 1950   6 Sheets-Sheet 3

FIG. 3

INVENTOR
Ernest A. Brooks
BY
J P Moran
ATTORNEY

April 28, 1953     E. A. BROOKS     2,636,351
EXPANSION LINKAGE FOR DIRECTING MOTION OF TUBULAR ELEMENTS
Filed July 11, 1950     6 Sheets-Sheet 4

FIG. 4

INVENTOR
*Ernest A. Brooks*
BY
*J. P. Moran*
ATTORNEY

April 28, 1953   E. A. BROOKS   2,636,351
EXPANSION LINKAGE FOR DIRECTING MOTION OF TUBULAR ELEMENTS
Filed July 11, 1950   6 Sheets-Sheet 5

FIG.5

INVENTOR
Ernest A. Brooks
BY
ATTORNEY

April 28, 1953 E. A. BROOKS 2,636,351
EXPANSION LINKAGE FOR DIRECTING MOTION OF TUBULAR ELEMENTS
Filed July 11, 1950 6 Sheets-Sheet 6

FIG. 6

INVENTOR
Ernest A. Brooks
BY
ATTORNEY

Patented Apr. 28, 1953

2,636,351

UNITED STATES PATENT OFFICE 2,636,351

EXPANSION LINKAGE FOR DIRECTING MOTION OF TUBULAR ELEMENTS

Ernest A. Brooks, Hudson, Ohio, assignor to The Babcock & Wilcox Company, New York, N. Y., a corporation of New Jersey Application July 11, 1950, Serial No. 173,020

15 Claims. (Cl. 60—108)

The present invention relates to fluid flow conduits, and more particularly to means for positioning flexible conduits in response to temperature changes within elements associated with the ends of the conduit.

In the generation of electric power, a motive fluid is generated by fuel combustion to form the source of the motive fluid, with the fluid thereafter conducted to a heat engine for the conversion of the heat energy in the motive fluid into mechanical and electrical energy. One example of the conversion of the heat energy into electric power lies in the modern central station power plant where vapor is generated and superheated at high pressures and temperatures by fuel combustion in a vapor generating unit, with the superheated vapor conducted to a turbo-generator set. The turbo-generator converts the heat energy of the superheated vapor into mechanical and electrical power. Both the vapor generating unit and the turbo-generator set are constructed and arranged to accommodate the expansion and contraction of their component parts as caused by temperature changes therein. The conduit or conduits connecting the source of vapor, i. e. the vapor generator, and the vapor user, i. e. the turbine, must, of necessity, be capable of absorbing its own expansion and contraction without rupture of the conduits. In addition, it is customary for the connecting conduit to not only absorb its own expansion and contraction, but also accommodate at least a portion of the expansion and contraction originating in both the vapor generating unit and the turbo-generator set. Thus, both ends of the conduit connecting the vapor source and the vapor user are subjected to thermal movements during operation.

Ordinarily the conduit connecting the vapor source and user can be provided with loops and offsets to permit necessary conduit movements without the imposition of dangerous localized stress forces upon the conduit. However, with the present tendency to increase vapor temperatures and pressures as well as quantities, the proper arrangement of the connecting conduits becomes more difficult and frequently loops and offsets in the conduit are inadequate for many installations to compensate for the movements imposed thereon, without dangerously overstressing the connecting conduits. This is particularly true when the turbo-generator set is located some distance from the vapor generating unit and the space available for movements of the connecting conduit is restricted.

In many of the present day vapor generating units, the tubular heat exchanger surfaces therein are supported from the top of the unit. In such units expansion of the furnace walls and other component parts of the unit is downward. Quite frequently the superheater vapor outlet from the unit is positioned intermediate the height of the unit and is subjected to movement with the furnace walls during operational temperature changes. Thus the inlet end or ends of the connecting conduit must be capable of movements which are predominantly vertical in direction. It will also be apparent that the vertical movement of the superheater outlet header, and the vapor generating unit, will occur even though no superheated vapor is flowing through the conduit connections to the turbo-generator set. Therefore, the connecting conduits must be capable of handling substantially the full movement caused by temperature changes in the vapor generator unit without any vapor flow to the vapor turbine.

In the normal operation of the vapor generating unit and the vapor user, the connecting conduit will be subjected to forces due to its own expansion and contraction as caused by temperature changes therein. In addition, operation of the turbo-generator set will cause the imposition of expansion and contraction forces at the discharge end of the connecting conduit. Ordinarily the turbo-generator set is arranged with a fixed position, relative to expansion and contraction, at some intermediate point of its housing. As a result, a temperature increase in the turbine due to starting operations with vapor flow, will cause expansion of the turbine leads toward the vapor generating unit. This movement will be predominantly horizontal in direction. Thus, the conduit or conduits connecting the vapor generator and the vapor user will be subjected to a variety of movements at one or both ends of the conduit, in addition to its own movement due to expansion and contraction caused by temperature changes.

In accordance with the present invention means are provided for displacing the intermediate portion of a flexible vapor flow conduit in response to temperature changes within elements associated with the conduit. The conduit displacing means is motivated by movements of external elements connected with the vapor flow conduit as such movements are caused by thermal changes within the external elements. The externally motivated drive means is constructed and arranged to displace the intermediate portion of the conduit in a direction and amount coordinated with the movement of the ends of the conduit so as to avoid the imposition of unsafe stresses on the conduit during high temperature and high pressure vapor flow therethrough. The drive means is actuated in advance of vapor flow through the conduit, and its operation is anticipatory in nature.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

While the present invention is applicable to the guidance of motions created by temperature changes in many types of fluid connections between either stationary or relatively moving end points, the invention is particularly applicable to the regulation of the movements of flexible tubular connections between the vapor outlet of a vapor generator and the inlet of a vapor receiver.

Figures 1, 7:
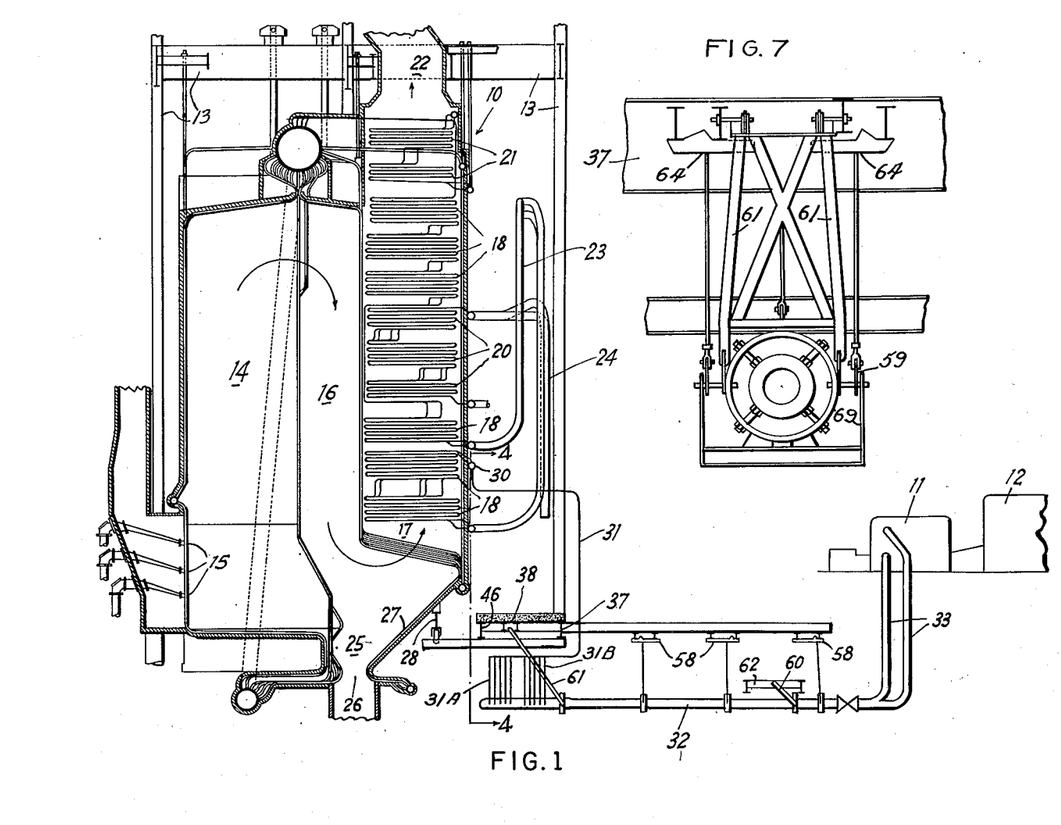
Fig. 1 is a side elevation view partly in section and partly diagrammatical, showing a vapor generator unit and a vapor user connected by vapor flow conduits constructed and arranged in accordance with the present invention.
Fig. 7 is an end view taken on line 7—7 of Fig. 2.

In general, as shown in Fig. 1, a vapor generating and superheating unit 10 of known type supplies superheated vapor to a vapor turbine 11 for the generation of electric energy in an associated generator 12. The unit 10 is top supported from the supporting steelwork 13, with the suspended parts of the unit expanding and contracting in a vertical direction, as such movements are necessitated by operational temperature changes within the unit. The turbine 11 is constructed and arranged to permit thermal expansion and contraction movements in a predominantly horizontal direction.

In the illustrated embodiment of the invention shown in Fig. 1, the vapor generator 10 is of an open pass type constructed, for example, to generate and superheat steam at a design pressure of 2300 p. s. i., and a temperature of 1050° F. As shown, fuel is introduced into the lower end portion of an upwardly elongated furnace 14 through burners 15 with the heating gases passing upwardly through the furnace 14 and then downwardly through a gas pass 16, both of which are enclosed by steam generating wall tubes. Thereafter the partially cooled heating gases pass upwardly through a convection pass 17 over successive banks of heat exchange tubes forming steam superheaters 18, steam reheater 20, and economizers 21. In passing from the uppermost surfaces of the economizer 21, the gases are directed through a passageway 22 into an air heater (not shown) and thence to the atmosphere.

In the arrangement shown, the superheater and reheater banks are subdivided into primary and secondary sections with external attemperators 23 and 24 between each section for proper regulation of steam temperatures. The lower end portions of the down pass 16 and the convection pass 17 are connected for heating gas flow and are provided with a hopper bottom 25 common to both, and having a lower ash outlet 26. The tubes and refractory materials forming the forwardly and downwardly inclined rear wall 27 of the hopper bottom is provided with a transverse beam 28 which is attached to the tubes of the wall 27 and to the side wall tubes of the unit in a well known manner. With the unit supported from above, and the walls thereof expanding downwardly as required by operating temperatures of the unit, the downward movement of the unit walls will be a definite amount for each temperature condition within the unit, so that temperature changes will move the beam 28 in a vertical direction a definite amount for each operating temperature change.

The superheater outlet header 30 is spaced downwardly from the support position of the unit, and as a result will have an appreciable, predominantly vertical movement due to changing temperatures during the initial operation of the unit, and which will be proportional to the vertical movements of the beam 28.

The header 30 is connected with the turbine 11 by means of a plurality of relatively flexible small diameter tubes 31 arranged in parallel and connected for series flow to a main steam manifold 32 and the turbine leads 33. As hereinafter described, the manifold 32 is supported and driven in a controlled direction and amount in accordance with the thermal expansion and contraction of the turbine 11, while the movement of the tubes 31 is controlled by a drive mechanism driven by the movement of the beam 28, in cooperation with a system of constant support hangers spaced along the tubes on either side of the drive mechanism.

Figure 4:
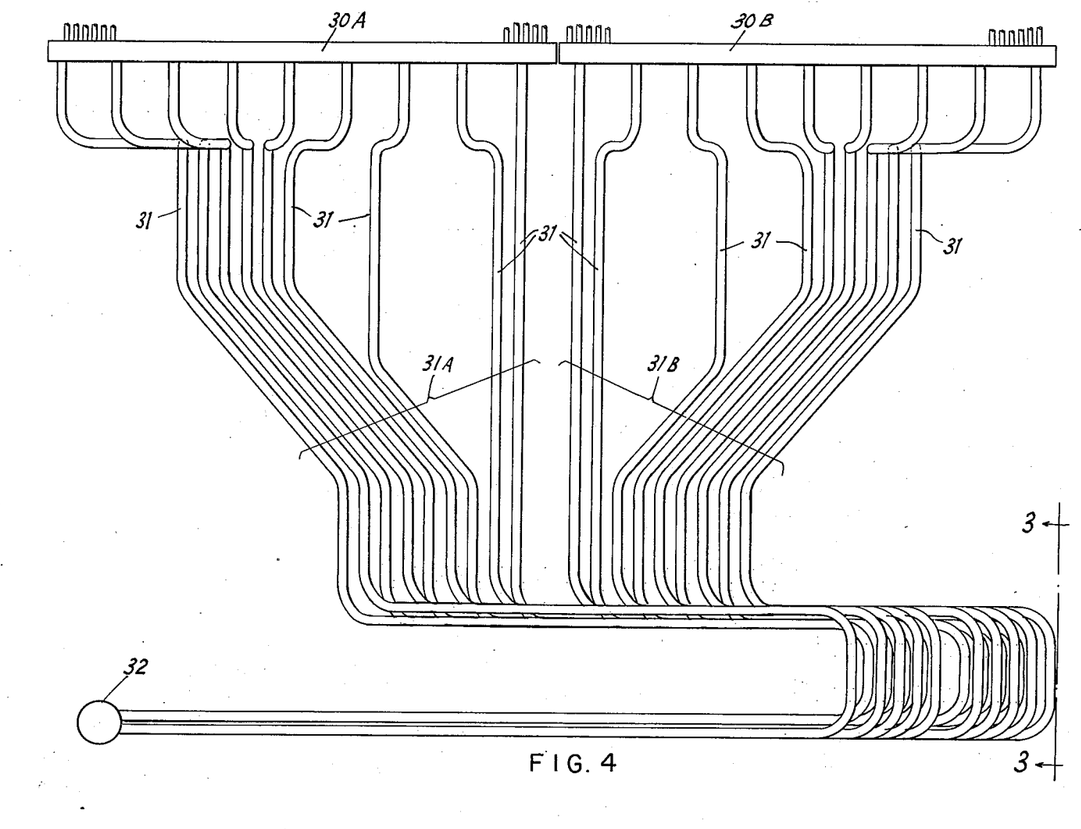
Fig. 4 is an end elevation of the vapor flow conduits taken on the line 4—4 of Fig. 1.

In the illustrated embodiment of the invention, the superheater outlet header 30 is formed in two separate equal portions 30A and 30B, with each portion anchored at the quarter points of the vapor generator rear wall. As a result, the tubes 31 from each portion of the superheater will have different side-to-side movements in a horizontal direction, as caused primarily by temperature changes in the headers 30A and 30B. The tubes 31 are 5¼ inch O. D. and are arranged in two groups 31A and 31B of 9 each, with each group connected to the outlet header portions 30A and 30B, respectively. As shown in Fig. 4, the tubes 31 extend downwardly from the headers 30A and 30B, are bent into a horizontal plane and extend outwardly and again downwardly to a level above the manifold 32. Thereafter alternate tubes are bent to lie in two vertically spaced horizontal rows extending away from the manifold 32, and are again bent downwardly into a pair of vertically spaced horizontal rows equally spaced above and below the longitudinal axis of and opening into the manifold 32.

Figure 3:
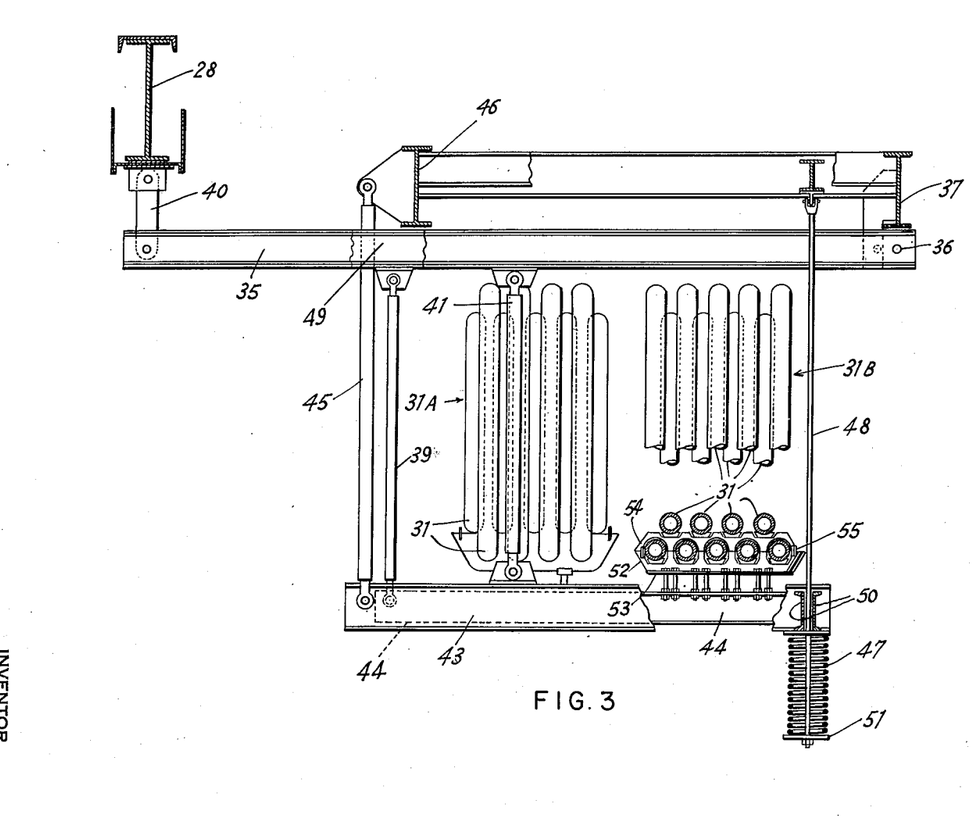
Fig. 3 is an enlarged elevation view, partly in section showing another portion of vapor flow conduits shown in Fig. 1 as viewed from line 3—3 of Figs. 4 and 5.
Figure 5:
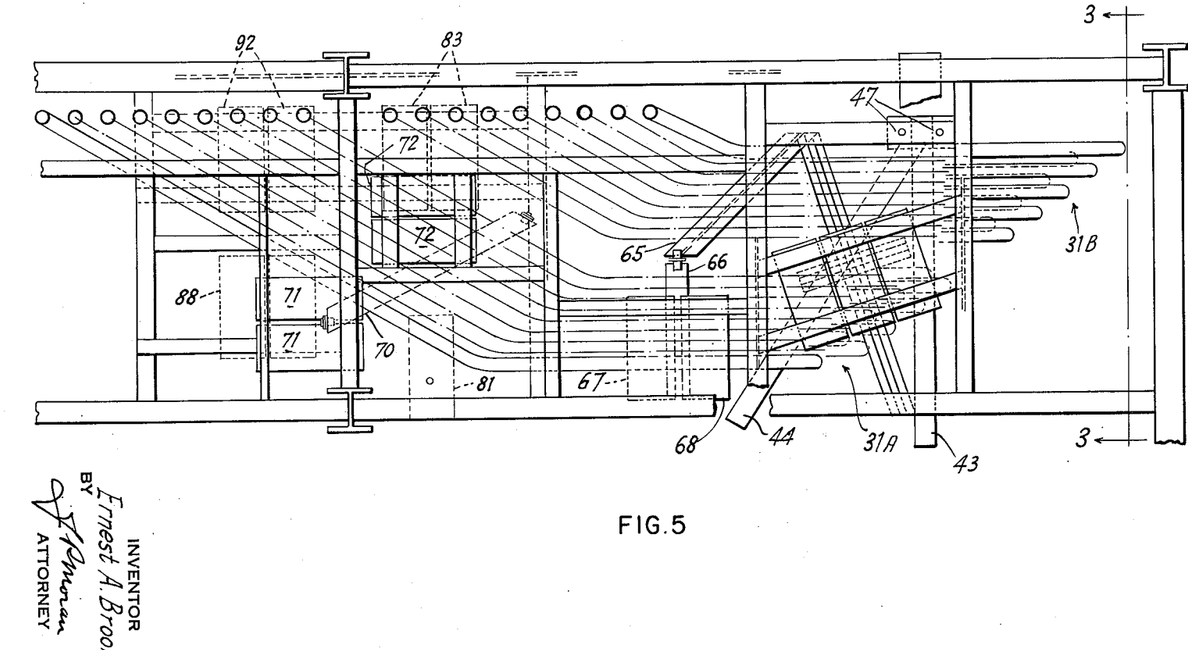
Fig. 5 is an enlarged plan view of the flexible expansion loops of the conduit system showing their return bend end portions as viewed from line 5—5 of Fig. 6.

As shown in Figs. 3 and 5, the drive mechanism for the tube groups 31A and 31B includes a diagonal platform or beam 44, extending transversely of the tube axes beneath the lower horizontal run of the tubes. The beam is attached at its outer end to a rod 39, which in turn is pivotably attached to a beam or lever arm 49. The arm is operatively connected at one end to the furnace floor beam 28 while its opposite end is pinned to a fulcrum supported by an I-beam 37 which is framed into the supporting structural steel of a stationary floor 38. Movement of the beam 28, as caused by temperature changes in the steam generating unit will cause movement of the lever arm 49 about its end fulcrum pin and movement of the end of the diagonal beam 44 through the rod 39. The opposite end of the beam 44 is framed into and attached to a beam 43, which rests upon a pair of compression springs 47. The beam 43 extends outwardly in a substantially normal direction relative to the axes of the tubes 31 to a pivotable connection with a depending rod 45 hung from and attached to a cross beam 46 of the floor 38. The pivotable connection with the rod 45 forms a fulcrum for the beam 43 for movement thereof as caused by vertical movement of a rod 41. As shown particularly in Fig. 3, the rod 41 is pivotably connected at its upper end with a beam or lever arm 35 which is provided with a pivot pin fulcrum 36 at one end and connected through a link 40 at its opposite end to the furnace floor beam 28.

In the construction described movement of the furnace floor beam 28 in, for example, a downward direction causes the spring supported end of the beam 43 to be moved downwardly by reason of the lever arm and linkage connection between the arm 35 and rod 41. The movement of the spring supported end of the beam 43 will be substantially vertical by reason of the spring guiding and supporting rod 48. The rod is suspended from the floor 38, and extends between spaced channels 50, mounted back to back in the connection between the beams 43 and 44, to a plate 51 at the lower end of the springs 47. Downward movement of the furnace floor beam 28 also depresses the outer end of the diagonal beam 44 through movement of the lever arm 49 acting through the rod 39. In the arrangement shown, the movement of the spring supported end of the diagonal beam will be of the order of 5.35 inches with maximum movement of the floor beam 28 acting through the connected linkage upon the beam 43. The outer end of the diagonal beam 43 will simultaneously be moved downwardly approximately 2.35 inches through the lever arm 49 and rod 39. Thus, downward movement of the beam 28 will tilt the diagonal beam 43 downwardly away from the steam generating unit.

The tube groups 31A and 31B are attached to the diagonal beam 44 and move therewith as motivated by the movements of the furnace floor beam 28. As shown in Fig. 3, a flat plate 52, having an angle base 53, is provided with spaced recesses to accommodate the lower sides of a row of the tubes 31. A second plate 54 having correspondingly spaced recesses fits on the upper edge of the plate 53 and is welded in place with the lugs 55 to encompass the lower row of tubes in a tube group. The upper edge of the plate 54 is also recessed to engage the upper row of tubes in a tube group. The angle base 53 of the plate 52 is bolted to the diagonal beam 44 so that the tubes 31 of the group move as a unit therewith. The second group of tubes is attached to the beam 44 in a similar manner at a position spaced along the diagonal beam 44, for movement with the beam, as motivated by the furnace floor beam 28.

With the expansion loop tube group 31B moved downwardly a greater amount than the tube group 31A by the described drive means, and with the manifold 32 tilted by a drive means hereinafter described, the tube 31 supporting elements between the opposite ends of the tubes and the intermediate position of the tube drive means must also be arranged for a differential downward movement of the tube groups. This differential support movement is accomplished in the horizontal extensions of the tubes 31, with a conventional arrangement of constant support hangers (not shown) positioned adjacent the upper end of the upright extension of the tubes 31 outwardly spaced from the header 30.

Constant support hangers are extensively used in the fluid conduit system described. Such hangers are known in the art and functionally are constructed to provide a substantially constant supporting force on a supported object, even though the supported object, such as a flexible fluid conduit may be moved by thermal forces to change the axial configuration of the conduit. The effect of such known constant support hangers in high temperature pipe line service is described in "Power," June 1940.

Figure 6:
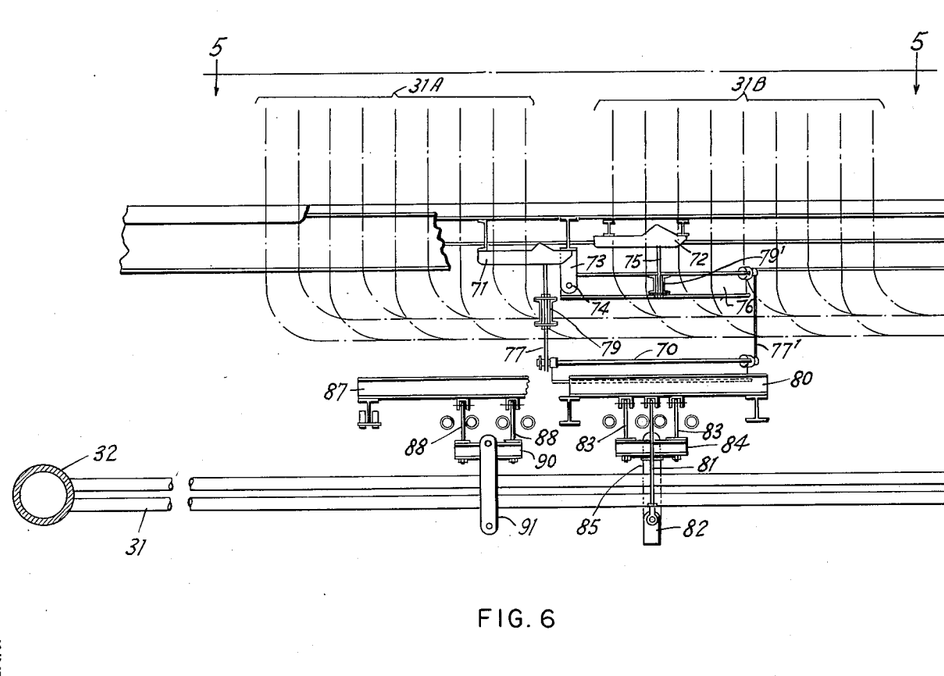
Fig. 6 is an elevation view showing the supports for the flexible expansion loops.

As shown in Figs. 5 and 6, the tube groups 31A and 31B are separately supported by weight supporting elements on both sides of the drive means acting on the tube groups through the diagonal beam 44. The supporting element for the tube group 31A on the up-stream side of the drive means includes a support bar 70 extending transversely of the tubes in supporting position beneath the tubes of the group. The opposite ends of the bar 70 are supported by strap hangers 77 and 77' each depending from the midpoint of a cross-bar. The cross-bar 79 is connected at its ends with the upright rod of a constant support hanger 71. The cross-bar 79' is connected at its ends with a rod 75 from each of the constant support hangers 72. A lever arm 76 is pivotably affixed to a link 73 of the supporting structural steel by a fulcrum pin 74, and connects at a position intermediate its length with the cross bar 79', so that the maximum allowable movement of the hanger 72, while still maintaining a constant support movement, is multiplied. In the example shown, the maximum movement of the bar 70 adjacent the strap hanger 77 is 3.5 inches, while the maximum movement adjacent the hanger 77' is 5.1 inches.

The support element for the tube group 31B is similar to that described for the group 31A with both ends of the tube support bar 65 supported by a lever arm, such as 66, restrained by a pair of constant support hangers such as 67 and 68.

The horizontal extensions of the tubes 31 leading from the driving means to the manifold 32, i. e. the lower level of tubes, are also separately supported in groups. The tube groups 31A rests directly upon a bar 82 supported at one end by the tie rod of a single constant support hanger 81, while the opposite end of the bar 82 is supported by a lever arm (not shown) connected through the crossbar 84 and the strap hanger 85 with the tie rods of a pair of constant support hangers 83. At this position the maximum vertical movement of the bar 82 is 3.35 inches and 4.60 inches at its opposite ends, with the greatest movement occurring at the end of the bar closest the vapor generator.

The tube group 31B is separately supported by a hanger element including the pairs of constant support hangers 88 and 92 acting through lever arms (not shown), cross bars, such as 90, and connecting links, such as 91, to a support bar. Depending upon the length of the tubes 31, it may be desirable to provide an additional set of constant support hangers adjacent the tube connections with the manifold 32. Such a support element would provide a support bar for both of the tube groups 31A and 31B and would be supplied with a suitable lever arm motion to permit differential vertical tube movements to correspond generally with the movement of the manifold 32.

Figure 2:
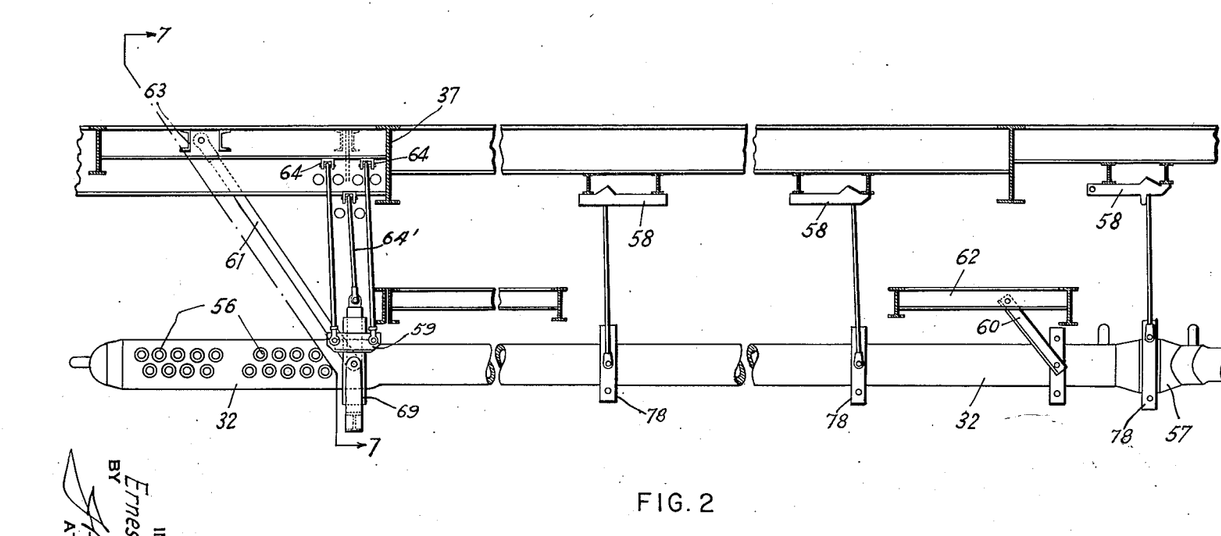
Fig. 2 is an enlarged elevation view showing a portion of the vapor flow conduits shown in Fig. 1.

As shown in Fig. 2, the tubes 31 discharge through the openings 56 into the end portion of the main steam manifold 32. The opposite end of the manifold is provided with a Y fitting 57 connecting to the separate turbine leads 33. The turbine leads are arranged for a predominantly horizontal movement toward the boiler unit as a resultant of temperature changes in the turbine and its leads, and the manifold is supported and provided with a linkage to accept and direct that thrust without overstressing the tubes 31 or the manifold 32. The weight of the manifold 32 is borne by a series of constant support hangers 58 of a conventional type. A pair of hangers 58 are installed at each support position with the lower end of each of the hanger rods pivotably attached on opposite sides of the manifold 32 to a support ring 78.

At the tube 31 connecting end of the manifold 32 two pairs of constant support hangers 64 are utilized, with the hangers turned 90° from the longitudinal axis of the manifold 32 and with companion pairs spaced apart at their supported end. This construction is illustrated in Figs. 2 and 7. The hanger rods from each pair of hangers are attached to one end of bridge beams 59 mounted to each side of a manifold support cradle 69. A fifth hanger 64' is positioned above the manifold 32 with its hanger rod attached to the cradle 69 in a substantially vertical plane common with the axis of the manifold. The fifth constant support hanger 64' is suspended by a bracket from the structural steelwork and positioned at a level below the level of the companion pairs of hangers 64. The arrangement of hangers described supports the manifold 32 during movements in a substantially vertical plane as hereinafter described, with the hangers 58 and 64 restraining sideway movement of the manifold as resulting from the end thrust of the tubes 31.

To direct the movement of the manifold in direction and amount a pair of guide lever arms 60 and 61 are pivotably connected to overhead structural steel members 62 and 63, respectively. The lever arm 60, at the turbine end of the manifold 32, is considerably shorter in length than the lever arm 61 at the tube 31 end of the manifold. With a movement of the turbine leads 33 toward the boiler, as caused by thermal expansion, the manifold 32 will move toward the boiler (to the left in Fig. 2), but will also have a simultaneous and proportional downward movement as directed by the arms 60 and 61. The downward component of such movement will lower the tube 31 end of the manifold more than the turbine end thereof so that the manifold will be tilted. The horizontal and vertical components of manifold movement caused by the thrust imposed thereon by the turbine leads, is determined by the arrangement and selected length of the lever arms 60 and 61. Such a movement results in a partial reduction of the stress imposed on the tubes 31, so that no part of the conduit system connecting the header 30 with the turbine 11 will be overstressed.

In the operation of a vapor generating unit and turbine of the type described, the vapor generator is started without any vapor flow to the turbine, with this condition continued until some portion of operating vapor pressure has been attained. During this period the temperatures within the wall tubes of the unit will rise substantially to full unit operating temperatures. With the increase in temperature the beam 28 will move downwardly, motivating a change in the axial configuration of the tubes 31, by reason of thermal changes external of the tubes.

With the delivery of superheated vapor to the turbine, the thermal changes in the turbine and its leads will cause a change in the position of the manifold 32 which will relieve the stress conditions in the tubes 31 resulting from their own increase in temperature. The movement of the manifold 32 is primarily motivated by thermal changes in the connected parts of the vapor flow system, although some movement of the manifold will be caused by its own expansion and contraction, as caused by temperature changes therein. Such movements will be added to the thrust imposed on the manifold from the turbine leads.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In combination, a vapor container subject to changes in position due to thermal expansion and contraction, a vapor using device spaced from said vapor container, a vapor flow conduit system including a tubular expansion loop connecting said vapor container and vapor using device, and linkage means connected with and arranged to coordinate the movement of an intermediate portion of said loop with the change in position of said vapor container.

2. In combination, a vapor generator having a vapor outlet header intermediate the height thereof, a vapor turbine spaced from said vapor generator, a vapor flow conduit system including a tubular expansion loop connecting said outlet header and turbine, and mechanical means connected with and moving an intermediate portion of said loop in the same direction as the movement of said outlet header as caused by temperature changes within the vapor generator.

3. In combination, a vapor generator having a vapor outlet header movable with temperature changes within the vapor generator, a vapor turbine spaced from said vapor generator, a vapor flow conduit system including a tubular expansion loop connecting said outlet header and turbine, and linkage means connected with and moving an intermediate portion of said loop in proportion to and in the same direction as the movement of said outlet header.

4. In combination, a high pressure vapor generator having a superheated vapor outlet header, a superheated vapor user, a vapor supply conduit connecting said header and said user including a tubular expansion loop, linkage means associated with a heat expansion motivated element of said vapor generator and with said expansion loop causing a movement of said loop upon heating of said vapor generator in anticipation of vapor flow through said vapor user.

5. In combination, a vapor generator having a superheated vapor outlet header intermediate its height, a vapor turbine spaced from said vapor generator, a vapor flow conduit system including a plurality of tubular expansion loops connecting the vapor outlet of said generator with said turbine, a member associated with said vapor generator and movable in accordance with temperature changes within said vapor generator, and mechanical means connecting said member with said expansion loops at a position intermediate their length to shift the position of the loops with the change in position of the outlet header as caused by temperature changes within the vapor generator.

6. In combination, a vapor generator having a superheated vapor outlet header intermediate its height, a vapor turbine spaced from said vapor generator, a flexible vapor flow conduit system connecting the vapor outlet of said generator with said turbine, a member associated with said vapor generator and movable in accordance with temperature changes within said vapor generator, and lever means connecting said member with said flexible conduit at a position intermediate its length to shift the position of the conduit in substantially the same direction as the change in position of the outlet header as caused by temperature changes within the vapor generator.

7. In combination, a top supported high pressure vapor generating and superheating unit having a superheated vapor outlet header positioned intermediate its height, a vapor turbine, a flexible vapor flow conduit system connecting said vapor generating and superheating unit with said turbine, a member associated with and movable in accordance with temperature changes within said vapor generator, a beam attached to said conduit system at an intermediate position in the extent thereof, said beam being pivotally supported at one end and spring restrained for movement at its opposite end, a lever beam mounted for pivotal movement in accordance with the movement of said member, and a rod connecting said lever beam and said beam, whereby the thermal movements of said vapor generating and superheating unit produces a proportionate movement in said conduit system.

8. In combination, a top supported vapor generator having a vapor outlet header intermediate the height thereof, a vapor turbine spaced from said vapor generator, a vapor flow conduit system including a tubular expansion loop and an elongated manifold connecting said outlet header and said turbine, means for coordinating the movement of an intermediate portion of said loop with the movement of said outlet header, and separate means for moving said elongated manifold in response to the movement of said turbine as caused by temperature changes therein.

9. In combination, a vapor generator having an outlet header for superheated vapor intermediate the height thereof, a vapor turbine spaced from said vapor generator, a vapor flow conduit system including a tubular expansion loop and an elongated manifold connecting said outlet header and said turbine, means motivated by temperature changes within said vapor generator for displacing an intermediate portion of said loop in proportion to the movement of said outlet header, and separate means for moving said elongated manifold in response to the movement of said turbine as caused by temperature changes therein.

10. In combination, a top supported vapor generator having a vapor outlet header intermediate the height thereof, a vapor turbine spaced from said vapor generator, a vapor flow conduit system including a plurality of tubular expansion loops and an elongated manifold connecting said outlet header and said turbine, a drive mechanism for moving an intermediate portion of said loops in the direction of movement of said outlet header as motivated by temperature changes within said vapor generator, and separate means motivated by temperature changes for moving said elongated manifold in proportion to the movements of said turbine.

11. In combination, a top supported vapor generator having a vapor outlet header intermediate its height, a vapor turbine spaced from said vapor generator, a vapor flow conduit system including a plurality of tubular expansion loops and an elongated manifold connecting the vapor outlet of said generator with said turbine, a drive mechanism motivated by temperature changes within said vapor generator for moving an intermediate portion of said loops in proportion to the movement of said outlet header, constant support means spaced from said drive mechanism and associated with said expansion loops, and separate means motivated by temperature changes within said turbine for tilting said manifold.

12. In combination, a vapor generating and superheating unit having a superheated vapor outlet header positioned intermediate its height, a vapor turbine, a flexible vapor flow conduit system connecting said vapor generating and superheating unit with said turbine, said conduit system including a plurality of tubular expansion loops opening into an elongated manifold, a member associated with and movable in accordance with temperature changes within said vapor generator, a platform beam attached to the expansion loops of said conduit system at an intermediate position in the extent thereof, said platform beam being pivotally supported at one end and spring restrained for movement at its opposite end, a lever arm mounted for pivotal movement in accordance with the movement of said member, and a rod connecting said lever arm and said platform beam whereby the thermal movements of said vapor generating and superheating unit produces a proportionate movement in the loops of said conduit system, and means for moving said elongated manifold toward said vapor generating unit and simultaneously moving the loop receiving end of said manifold downwardly during flow of vapor to said vapor turbine.

13. In combination, a vapor generating and superheating unit having a superheated vapor outlet header positioned intermediate its height movable in a predominantly vertical direction with change of temperature in said unit, a vapor turbine movable in a predominantly horizontal direction with change of temperature therein, a flexible fluid conduit system connecting said vapor generating and superheating unit with said turbine, said conduit system including a plurality of tubular expansion loops opening into an elongated substantially horizontally disposed manifold, a member associated with and movable in accordance with temperature changes within said vapor generator, a platform beam attached to the loops of said conduit system at an intermediate position in the extent thereof, said platform beam being pivotally supported at one end and spring restrained for movement at its opposite end, a lever arm mounted for pivotal movement in accordance with the movement of said member, a rod connecting said lever arm and said platform beam, whereby the thermal movements of said vapor generating and superheating unit produces a proportionate movement in the loops of said conduit system, and means for relieving some of the stresses in said loops by tilting said manifold during heat expansion of said turbine comprising a pair of arms pivotally mounted above and secured to the opposite end portions of said manifold, the length of the pivot arm adjacent the turbine end of said header being shorter than the arm adjacent said loop connections with said manifold.

14. In a flexible tubular loop having its ends moved by thermally motivated forces, the combination comprising driving means for displacing said loop at a position intermediate its length in response to thermal changes, and means for supporting said loop between said intermediate position and said loop ends including a transverse member attached to said tubular loop connection, a constant support hanger directly secured to one end of said transverse member, and a separate constant support hanger attached through a lever arm with the other end of said transverse member.

15. In a flexible tubular loop having its ends moved by thermally motivated forces, the combination comprising driving means for displacing said loop at a position intermediate its length in response to external thermal forces, and means for supporting said loop between said intermediate position and said loop ends including a transverse member engaging said loop, a pair of lever arms positioned above said transverse member, each arm pivoted about a fulcrum at one end thereof, a rod connecting each of said lever arms with an end of said transverse member, and a constant support hanger associated with each of said lever arms.

ERNEST A. BROOKS.

References Cited in the file of this patent
UNITED STATES PATENTS

| Number | Name | Date |
|---|---|---|
| 2,079,165 | Gorrie | May 4, 1937 |